United States Patent
Goscenski

[15] 3,677,007
[45] July 18, 1972

[54] CONCENTRIC BRAKE BOOSTER WITH MOVING HOSES

[72] Inventor: Edward J. Goscenski, Marshall, Mich.
[73] Assignee: The Bendix Corporation
[22] Filed: Sept. 29, 1970
[21] Appl. No.: 76,409

[52] U.S. Cl. ......................................60/54.6 P, 91/6, 60/51
[51] Int. Cl. ..............................F15b 7/00, F03b, F01b 25/02
[58] Field of Search ......................60/54.5, 54.6 P, 52 B, 51; 91/6

[56] References Cited

UNITED STATES PATENTS

| | | | |
|---|---|---|---|
| 3,353,451 | 11/1967 | Garrison et al. | 60/51 |
| 2,945,352 | 7/1960 | Stelzer | 60/51 |
| 2,410,269 | 10/1946 | Chouings | 60/54.6 P |
| 3,148,592 | 9/1964 | Schultz et al. | 60/54.6 P |
| 2,502,487 | 4/1950 | Scholl | 92/88 |
| 2,745,382 | 5/1956 | Heintzen | 92/88 |
| 3,119,235 | 1/1964 | Lewis et al. | 60/54.5 P |

FOREIGN PATENTS OR APPLICATIONS

| | | | |
|---|---|---|---|
| 722,520 | 11/1965 | Canada | 60/54.5 P |

Primary Examiner—Martin P. Schwadron
Assistant Examiner—A. M. Zupcic
Attorney—Ken C. Decker and Plante, Hartz, Smith & Thompson

[57] ABSTRACT

A concentric brake booster is disclosed which includes a housing defining a bore therein, a piston shiftable within the bore, and a spool valve slidably mounted within the piston to selectively admit pressurized fluid into the chamber defined between the end of the piston and a corresponding end of the housing to urge the piston in a direction applying the brakes of the vehicle. A portion of the housing is cut away to define an opening therein. The piston is provided with a portion that extends through the opening that houses an inlet port, an outlet port, and a return or exhaust port. Each of the ports are communicated with other fluid appliances in the vehicle hydraulic system by hoses which move with the piston as the latter shifts within the housing. A fluid storage device or accumulator is provided to supply pressurized fluid to the brake booster to be used to shift the piston when a malfunction prevents proper operation of the vehicle's power steering pump which normally supplies pressurized fluid to the booster.

9 Claims, 1 Drawing Figure

PATENTED JUL 18 1972  3,677,007
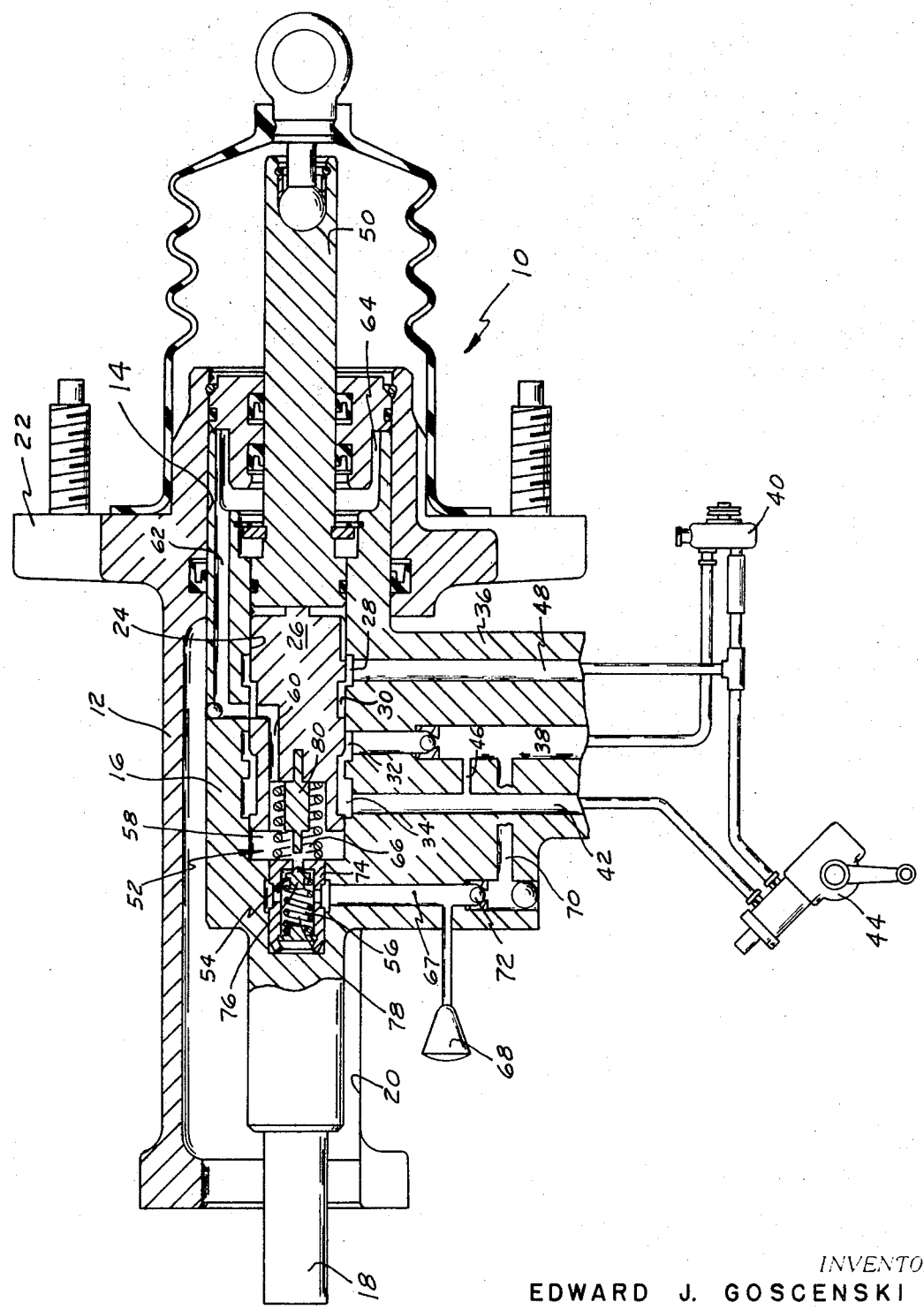
INVENTOR.
EDWARD J. GOSCENSKI
BY
Ray C. Derker
ATTORNEY

CONCENTRIC BRAKE BOOSTER WITH MOVING HOSES

BACKGROUND OF THE INVENTION

This invention relates to a hydraulic brake booster.

Because of their smaller size and lower weight, hydraulic brake boosters are expected to be used in lieu of existing vacuum-operated boosters in the near future. In order to minimize the size of the booster unit, a common design provides a piston shiftable within the booster housing, and a spool valve which is slidably mounted within the piston itself that controls fluid communication into the chamber defined between the end of the piston and the end of the housing for shifting the piston. Such a brake booster is disclosed in copending U.S. Pat. application, Ser. No. 794,472 filed Jan. 15, 1969, owned by the assignee of the present invention, and incorporated herein by reference. However, a problem with the unit disclosed in the aforementioned application, in which the valve is mounted within the piston and moves with the latter, is to communicate fluid to the valve. The booster disclosed in the aforementioned patent application provides several close fitting slots between the piston and the housing that receives the fluid that is to be communicated to the valve. However, this design has proved to be quite difficult to manufacture and also requires a number of high pressure sliding seals.

SUMMARY OF THE INVENTION

Therefore, an important object of my invention is to provide a brake booster wherein pressurized fluid is communicated directly to the spool valve that is mounted within the piston of the booster.

Another important object of my invention is to simplify the sealing problem inherent in existing hydraulic brake boosters.

Another important object of my invention is to provide a brake booster of minimum size.

Still another important object of my invention is to communicate fluid directly to the spool valve housed within the piston used in my brake booster through hoses that move with the piston as the brakes of the vehicle are applied.

BRIEF DESCRIPTION OF THE DRAWINGS

The sole FIGURE of the drawings schematically illustrates a vehicle hydraulic system with a brake booster made pursuant to the teachings of my present invention shown in cross-section.

DETAILED DESCRIPTION

Referring now to the drawing, a brake booster 10 includes housing 12 defining a bore 14 therewithin. One end of a boost piston 16 is slidably mounted in the bore 14, and an elongated rod 18 interconnects the other end of the piston 16 with a standard automotive master cylinder (not shown) mounted to the left of the booster housing 12 (viewing the Figure). A portion of the housing 12 is cut away to define an elongated opening 20 therein, which exposes a portion of the periphery of the piston 16. A standard mounting flange 22 is provided on the housing 12 to mount the brake booster to the firewall of the vehicle.

The piston 16 defines another bore 24 therewithin. A spool valve generally indicated at 26 is slidably mounted in the bore 24. The spool valve 26 and the bore 24 are provided with spaced recesses that define fluid cavities 28, 30, 32, and 34, therebetween. A portion 36 of the piston 16 extends through the opening 20 and houses an inlet port 38 that communicates the cavity 32 with the outlet of a power steering pump 40. An outlet passage 42 provided in the portion 36 communicates the cavity 34 with the inlet of the power steering gear 44. A small passage 46 permits metered flow of fluid between the inlet port 38 and the outlet port 42. A return or exhaust port 48 within the portion 36 communicates the cavity 28 with the inlet of the power steering pump 40. The outlet of the power steering gear 44 is also communicated to the inlet of the pump 40.

One end of an operator-actuated control rod 50 is slidably mounted in the bore 24 and engages the end of the spool valve 26. The other end of the control rod 50 is connected to the usual brake pedal (not shown) mounted in the operator's compartment of the vehicle. A fluid compartment 52 is defined between the other end of the spool valve 26 and the corresponding end of the bore 24. A flow control device or check valve 54 divides the compartment 52 into a first section 56 and a second section 58. A first fluid passage 60 communicates the section 58 with the cavity 30, and a second fluid passage 62 communicates the cavity 30 with a chamber 64 defined between the end of the piston and a corresponding end of the housing 12. A spring 66 yieldably urges the spool valve 26 and the rod 50 to the right (viewing the Figure), toward the brake release position.

Another port 67 within the portion 36 of the piston 16 communicates the section 56 of the compartment 52 with a fluid storage device or accumulator 68. Another passage 70 within the portion 36 communicates the port 67 with the port 38 to permit flow of fluid into the accumulator whenever the fluid pressure level in the inlet port 38 exceeds the fluid pressure level in the accumulator 68. A check valve generally indicated as at 72 prevents reverse flow of fluid from the accumulator into the inlet port 38.

The check valve 54 includes a valve seat 74 mounted in the compartment 52 and a valve member 76 that is normally urged against the seat 74 by a spring 78 to prevent fluid communication through the seat 74. A plunger 80 is mounted on the end of the spool valve 26 and is adapted to force the valve member 76 off the seat 74 thereby permitting fluid communication between the sections 56 and 58 of the compartment 52 when the spool valve 26 is shifted a sufficient distance.

MODE OF OPERATION

The Figure illustrates the relative position of the various components of the brake booster 10 when the brakes of the vehicle are released. When the brakes are released, spool valve 26 is disposed in a position venting the chamber 64 to the inlet of the pump 40 through the passage 62, cavities 30 and 28, and the outlet port 48. In this position, the cavity 32 is communicated to the cavity 34 so that substantially all of the fluid flowing in the inlet port 38 is communicated directly to the outlet port 42 and from there to the inlet of the power steering gear 44. When the vehicle operator effects a brake application, the operator-operated input rod 50 is moved to the left viewing the Figure, therefore also moving the spool valve 26 to the left. As the spool valve 26 moves to the left, fluid communication between the cavities 28 and 30 is terminated, thereby also terminating fluid communication between the chamber 64 and the inlet of the pump 40, and shortly thereafter fluid communication is initiated between the cavities 30 and 32. A portion of the fluid flowing into the inlet port 38 is then directed to the chamber 64 through the cavity 30 and the passage 62, although most of the fluid continues to flow from the cavity 32 to the cavity 34 and out of the outlet port 42. Even if the spool valve 26 is shifted far enough such that fluid communication between the cavities 32 and 34 is terminated, fluid still flows between the inlet port 38 and the outlet port 42 through the passage 46, thereby assuring an adequate supply of fluid pressure for operating the power steering gear 44.

The fluid pressure communicated into the chamber 64 through the cavities 32 and 30 and the passage 62 acts upon the right hand side of the piston 16 (viewing the Figure) to urge the latter to the left to operate the master cylinder of the vehicle in the normal manner to apply the brakes of the vehicle. The high pressure fluid communicated into the chamber 64 is also communicated into the section 58 of the compartment 62 through the passage 60. Pressurized fluid in the section 58 acts upon the left end of the spool valve 26 to create a force opposing movement of the latter which is transmitted to the input rod 50 and is therefore transmitted to the vehicle operator. This force is proportional to the fluid pressure level in the chamber 64, and therefore increases as the brake-applying force is increased, thereby providing proper brake "feel" to the vehicle operator.

As long as the power steering pump 40 of the vehicle functions normally, an adequate supply of pressurized fluid is assured to operate both the brake booster 10 and the power steering gear 44. A portion of this fluid is communicated into the fluid storage device 68 from the inlet port 38 through the passage 70 whenever the fluid pressure level in the accumulator or fluid storage device 68 falls below the fluid pressure level in the inlet port 38. Fluid stored in the accumulator 68 is used to operate the brake booster 10 when the power steering pump 40 malfunctions or when the engine of the vehicle ceases to operate while the car is in motion. When this occurs, the spool valve 26 is shifted past the position wherein fluid communication between the cavities 30 and 32 is initiated, and continues to move to the left viewing the Figure until the plunger 80 engages the valve member 76, forcing the latter from the seat 74 to permit flow of fluid through the seat 74 from the accumulator 68 to the section 58 of the compartment 52. High pressure fluid from the accumulator is then communicated to the chamber 64 through the passages 60 and 62 to shift the piston 16 to apply the vehicle's brakes in the normal manner. Fail-safe operation of the brake booster 10 is therefore assured, even if the power steering pump 40 of the vehicle is inoperative.

I claim:

1. In a hydraulic boost device:
a housing defining a first bore therewithin;
a piston slidably mounted in said first bore cooperating with one end of said housing to define a fluid chamber therebetween;
a second bore defined within said piston;
an elongated opening in the wall of said housing exposing a portion of the outer surface of said piston;
fluid ports extending through said piston communicating said second bore with the portion of the outer surface of said piston exposed by said elongated opening;
operator-actuated valve means in said second bore for controlling fluid communication between said fluid ports and said chamber, said valve means admitting pressurized fluid into said chamber when a brake application is effected to slide said piston; and
conduit means communicating said fluid ports with the vehicle's hydraulic system, said conduit means shifting with said piston relative to said housing when the piston slides within said housing.

2. The invention of claim 1:
said piston including a portion extending through said elongated opening:
said conduit means including an inlet port, an outlet port, and an exhaust port housed within said portion.

3. The invention of claim 1:
said second bore having an inlet port in fluid communication with a pressure source, an outlet port, and an exhaust port in fluid communication with a fluid reservoir;
said valve means being slidably mounted in said second bore and shiftable from a first position communicating substantially all of the fluid flowing into the inlet port to the outlet port and communicating said chamber to the exhaust port to a second position communicating at least a portion of the fluid flowing into the inlet port to said chamber for shifting said piston.

4. The invention of claim 1:
a fluid compartment within said second bore defined between one end of the valve means and a corresponding end of the second bore:
operator-actuated control means extending from said housing for actuating said valve means; and
passage means within said piston for communicating said chamber with said compartment to permit pressurized fluid to act upon said one end of the valve means whereby a reactive force proportional to the fluid pressure level in said chamber is transmitted to said rod through said valve means.

5. The invention of claim 1:
said valve means including a spool valve slidably mounted in said second bore; and
operator-operated control means for actuating said spool valve projecting from said housing.

6. In a vehicle hydraulic system having a pressure source, a fluid reservoir, and an accumulator, a hydraulic boost device comprising:
a housing defining a bore therewithin;
a piston slidably mounted within said bore cooperating with said housing to define a fluid chamber between one end of said piston and a corresponding end of said housing;
said housing having an opening extending therethrough exposing a portion of the outer surface of said piston;
said piston defining a second bore therein;
fluid ports extending through said piston communicating said second bore with the portion of the outer surface of said piston exposed by said elongated opening;
valve means slidably mounted in said piston bore and shiftable from a first position communicating said chamber to the reservoir to a second position communicating said chamber to the pressure source;
conduit means extending through said openings and communicating said fluid ports with said pressure source, said reservoir, and said accumulator, said conduit means shifting with said piston relative to said housing when the piston slides within said housing;
said valve means being operative to permit flow of fluid through said conduit means from the accumulator to the chamber when the valve means is shifted past the second position and a malfunction prevents a fluid communication between the pressure source and the chamber.

7. The invention of claim 6;
said conduit means including passage means communicating said accumulator with said second bore; and
normally closed flow control means within said piston for controlling flow of fluid through said passage means;
said valve means being operative to open said flow control means when the valve means is shifted a predetermined distance beyond said second position.

8. The invention of claim 7:
a fluid compartment within said piston bore defined between one end of the valve means and a corresponding end of the piston bore;
said flow control means being mounted in said compartment dividing the latter into a first section between the control means and the end of the bore and a second section between the control means and the end of the valve means;
said passage means including a first fluid channel communicating said accumulator with said first section and a second fluid channel communicating said second section with said chamber; and
means carried on said one end of said valve means for opening said flow control means to permit flow of fluid from accumulator into the chamber upon movement of the valve means a predetermined distance past said second position.

9. The invention of claim 8:
said piston having a portion extending through said opening;
said conduit means including a first section extending between said pressure source and one of said fluid ports and a second section extending between another of said fluid ports and said reservoir;
said first and second sections of said conduit means and said first fluid channel extending through said portion; and
a fluid passage extending through said portion between said first fluid channel and the first section of the conduit means to permit flow of fluid into the fluid storage device when the pressure level in the latter is less than the pressure level in the first section of the conduit.

* * * * *